(12) United States Patent
Lister et al.

(10) Patent No.: US 10,801,612 B1
(45) Date of Patent: Oct. 13, 2020

(54) MACHINE TRANSMISSION WITH CLUTCH ELEMENT HYDRAULIC CONTROL

(71) Applicant: Caterpillar Inc., Deerfield, IL (US)

(72) Inventors: Brian E. Lister, Edwards, IL (US); Gaurav Vasudeva, Dunlap, IL (US); Konrad Garrett, Pekin, IL (US); Aaron B. Crabtree, Metamora, IL (US); Michael Beyer, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/396,219

(22) Filed: Apr. 26, 2019

(51) Int. Cl.
*F16H 61/12* (2010.01)
*F16H 61/00* (2006.01)
*F16H 45/00* (2006.01)

(52) U.S. Cl.
CPC ......... *F16H 61/12* (2013.01); *F16H 61/0025* (2013.01); *F16H 2045/002* (2013.01); *F16H 2061/124* (2013.01); *F16H 2061/1232* (2013.01)

(58) Field of Classification Search
None
See application file for complete search history.

(56) References Cited

U.S. PATENT DOCUMENTS

| | | | |
|---|---|---|---|
| 3,338,360 A | 8/1967 | Cornillaud | |
| 5,035,312 A | 7/1991 | Asayama et al. | |
| 5,105,922 A | 4/1992 | Yant | |
| 5,609,067 A | 3/1997 | Mitchell et al. | |
| 6,155,396 A | 12/2000 | Tsubata et al. | |
| 6,357,289 B1 | 3/2002 | Futawatari | |
| 6,805,649 B2 * | 10/2004 | Kim | F16H 61/0206 475/119 |
| 6,942,591 B2 * | 9/2005 | Park | F16H 3/663 475/116 |
| 7,104,910 B2 * | 9/2006 | Morise | F16H 61/12 475/119 |
| 7,134,536 B2 * | 11/2006 | Morise | F16H 61/12 192/3.58 |
| 7,244,209 B2 * | 7/2007 | Nozaki | F16H 61/0206 475/119 |
| 7,255,212 B2 * | 8/2007 | Morise | F16H 61/12 192/3.58 |
| 7,356,399 B2 | 4/2008 | Eguchi et al. | |
| 7,611,434 B2 * | 11/2009 | Fukushima | F16H 61/12 475/119 |

(Continued)

*Primary Examiner* — Dirk Wright
(74) *Attorney, Agent, or Firm* — Miller, Matthias & Hull

(57) ABSTRACT

A transmission for a machine is disclosed. The transmission may comprise a torque path providing a path for transmission of torque from an input shaft to an output shaft, and a single clutch element along the torque path. The transmission may further comprise a clutch actuator configured to actuate engagement of the clutch element, and a clutch pressure control (CPC) valve configured to permit a flow of hydraulic fluid to the clutch actuator through a control pressure line when in an open position to cause the clutch actuator to actuate engagement of the clutch element. The transmission may further comprise a failure mode response (FMR) valve in the control pressure line between the CPC valve and the clutch actuator. The FMR valve may have a failure position obstructing flow of the hydraulic fluid from the CPC valve to the clutch actuator when the CPC valve is in the open position.

20 Claims, 8 Drawing Sheets

(56) References Cited

U.S. PATENT DOCUMENTS

| | | |
|---|---|---|
| 7,771,317 B2 | 8/2010 | Gierer et al. |
| 7,811,192 B2 * | 10/2010 | Hong .................. F16H 61/0206 |
| | | 475/119 |
| 8,527,169 B2 * | 9/2013 | Long ................... F16H 61/0206 |
| | | 192/3.28 |
| 2007/0225102 A1 * | 9/2007 | Takagi ................... F16H 61/12 |
| | | 475/123 |
| 2010/0236887 A1 * | 9/2010 | Sakamoto ........... F16H 61/0206 |
| | | 192/3.3 |
| 2011/0011689 A1 * | 1/2011 | Sakamoto ............. F16H 61/143 |
| | | 192/3.3 |
| 2016/0003347 A1 | 1/2016 | Bartl |

\* cited by examiner

MACHINE TRANSMISSION WITH CLUTCH ELEMENT HYDRAULIC CONTROL

TECHNICAL FIELD

The present disclosure generally relates to transmissions for machines and, more specifically, to hydraulic control systems for clutch elements in transmissions.

BACKGROUND

Vehicles such as work machines may include a powertrain to transmit power from a power source (e.g., an internal combustion engine) to driven elements such as wheels, tracks, or other propulsion devices for vehicle travel. The powertrain may include a transmission that allows power transmission from an input shaft rotationally coupled to the power source to an output shaft rotationally coupled to the driven elements. The transmission may reduce the higher engine speed to a lower output speed to the driven elements, increasing torque in the process. A transmission may include a number of torque paths that each transmit torque from the input shaft to the output shaft at a different gear ratio. For example, a conventional transmission design may have five torque paths at different gear ratios, including three forward gears and two reverse gears. Shifting between the gears may be achieved automatically in automatic transmissions, or manually by the operator in manual transmissions. In conventional transmission designs, each torque path may include at least two clutch elements (clutches, synchronizers, sliding dog collars, etc.) that are engaged simultaneously to complete the torque path and permit torque transmission from the input shaft to the output shaft. Actuation of clutch element engagement may be controlled hydraulically by hydraulic fluid pressure supplied from a hydraulic fluid source through an actuation valve. The engine electronic control module (ECM) may command opening and closing of the actuation valve associated with each clutch element.

The engagement of at least two clutch elements to complete each torque path allows one of the clutch elements to disengage and interrupt torque transmission along the torque path if there is a fault or failure in the actuation valve of the other clutch element. Failure of the actuation valve may occur, for example, due to valve contamination that prevents the valve spool from moving freely, or due to electrical faults. A fault or failure in the actuation valve may result in hydraulic fluid delivery to the clutch element for engagement without a command from the ECM. Without a second clutch element that disengages to interrupt the torque path, the transmission may be stuck in an undesired gear and uncommanded motion of the machine may result. While effective for at least the aforementioned reasons, the use of at least two clutch elements in each torque path may be more expensive and space consuming than a single clutch element design.

In addition, current methods for detecting a fault or failure in the actuation valve may rely on speed or torque sensors whose responses may be time delayed. The delay may be exaggerated under certain operating conditions such as, but not limited to, cold ambient conditions as may be experienced during machine start-up. The delay may impede the machine's designed failure response, and possibly create delays from the operator's perspective.

U.S. Patent Application Number 2010/0236887 discloses a hydraulic pressure control apparatus for a hydraulic power transmission that includes a turbine runner receiving oil from a pump impeller, and a multi-plate impeller clutch that engages the pump impeller to a power source by supplying hydraulic pressure to a hydraulic pressure chamber. The apparatus is designed such that the clutch is securely engaged even if any of the components of the apparatus fail so that the vehicle remains operable. However, the patent application does not describe strategies for interrupting torque transmission along a torque path in case of failure of a hydraulic clutch element actuation system and, therefore, does not address the aforementioned problems.

Accordingly, there is a need for improved or alternative strategies to block power transmission through a torque path of a transmission when there is a failure in a hydraulic actuation system for a clutch element in the torque path. Additionally, there is also a need for improved strategies for detecting a failure in the hydraulic actuation system.

SUMMARY

In accordance with one aspect of the present disclosure, a transmission for a machine is disclosed. The transmission may comprise an input shaft rotationally coupled to a power source, an output shaft, and a torque path providing a path for transmission of torque at a gear ratio from the input shaft to the output shaft. The transmission may further comprise a single clutch element along the torque path. The clutch element may be configured to permit the transmission of torque from the input shaft to the output shaft when engaged, and to block the transmission of torque from the input shaft to the output shaft when disengaged. In addition, the transmission may further comprise a clutch actuator configured to actuate shifting of the clutch element between engaged and disengaged, and a clutch pressure control (CPC) valve having an open position and a closed position. The CPC valve may be configured to permit a flow of hydraulic fluid to the clutch actuator through a control pressure line when in the open position to cause the clutch actuator to engage the clutch element. Additionally, the transmission may further comprise a failure mode response (FMR) valve in the control pressure line between the CPC valve and the clutch actuator. The FMR valve may have a normal position permitting the flow of the hydraulic fluid from the CPC valve to the clutch actuator when the CPC valve is in the open position. The FMR valve may further have a failure position obstructing the flow of the hydraulic fluid from the CPC valve to the clutch actuator while simultaneously allowing the flow of the hydraulic fluid from the clutch actuator to a hydraulic fluid sump when the CPC valve is in the open position. The transmission of torque along the torque path may be interrupted when the FMR valve is in the failure position.

In accordance with another aspect of the present disclosure, a hydraulic control system for controlling a clutch element of a transmission of a machine is disclosed. The transmission may have a torque path for transmission of torque at a gear ratio from an input shaft to an output shaft. The clutch element may be the only clutch element along the torque path, and may be configured to permit the transmission of torque from the input shaft to the output shaft when engaged. The hydraulic control system may comprise a clutch actuator configured to actuate shifting of the clutch element between engaged and disengaged, and a clutch pressure control (CPC) valve having an open position and a closed position. The CPC valve may be configured to permit a flow of hydraulic fluid to the clutch actuator through a control pressure line when in the open position to cause the clutch actuator to engage the clutch element. The CPC valve may be further configured to permit a drain of the hydraulic fluid from the clutch actuator to a hydraulic fluid sump when in the closed position. The hydraulic control system may further comprise a failure mode response (FMR) valve in the control pressure line between the CPC valve and the clutch actuator. The FMR valve may have a normal position permitting the flow of the hydraulic fluid from the CPC valve to the clutch actuator when the CPC valve is in the open position. The FMR valve may further have a failure position obstructing the flow of the hydraulic fluid from the CPC valve to the clutch actuator while simultaneously allowing the flow of the hydraulic fluid from the clutch actuator to a hydraulic fluid sump when the CPC valve is in the open position. Additionally, the hydraulic control system may further comprise at least one sensor configured to detect a failed condition of the CPC valve, and an electronic control module (ECM) in electronic communication with the CPC valve, the FMR valve, and the sensor. The ECM may be configured to command shifting of the CPC valve between the open position and the closed position, and to command shifting of the FMR valve between the normal position and the failure position. The ECM may command the shifting of the FMR valve to the failure position upon receipt of one or more signals from the sensor indicating the failed condition of the CPC valve.

In accordance with another aspect of the present disclosure, a method for hydraulically controlling a clutch element along a torque path of a transmission of a machine is disclosed. The transmission may include a clutch actuator configured to actuate shifting of the clutch element between engaged and disengaged, and a clutch pressure control (CPC) valve having an open position configured to permit a flow of hydraulic fluid to the clutch actuator through a control pressure line to cause the clutch actuator to engage the clutch element. The transmission may further include a failure mode response (FMR) valve in the control pressure line between the CPC valve and the clutch actuator. The method may comprise determining whether the CPC valve is in a failed condition. The CPC valve may be in the failed condition when the CPC valve is in the open position without a command to be in the open position. The method may further comprise commanding the FMR valve to shift to or stay in a failure position if the CPC valve is in the failed condition. The failure position of the FMR valve may obstruct the flow of the hydraulic fluid from the CPC valve to the clutch actuator while simultaneously allowing the flow of the hydraulic fluid from the clutch actuator to a hydraulic fluid sump when the CPC valve is in the open position. The transmission of torque along the torque path may be interrupted when the FMR valve is in the failure position. The method may further comprise commanding the FMR valve to shift to or stay in a normal position if the CPC valve is not in the failed condition. The normal position of the FMR valve may permit the flow of the hydraulic fluid from the CPC valve to the clutch actuator when the CPC valve is in the open position.

These and other aspects and features of the present disclosure will be more readily understood when read in conjunction with the accompanying drawings.

DETAILED DESCRIPTION

Figure 1:
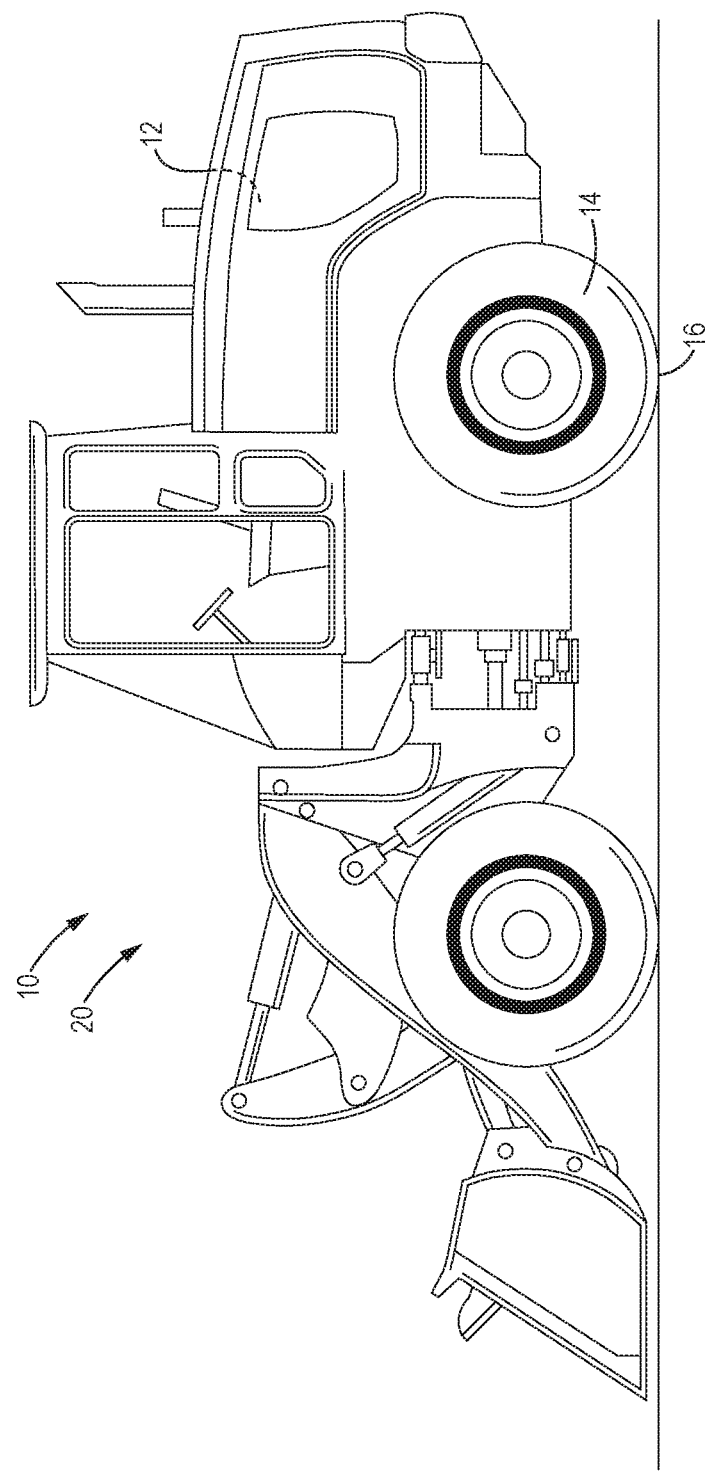
FIG. 1 is a side view of a machine, constructed in accordance with the present disclosure.

Referring now to the drawings, and with specific reference to FIG. 1, a machine 10 is shown. The machine 10 may include a power source 12, such as an internal combustion engine, that drives driven elements 14 such as wheels 16, tracks, or other propulsion devices for movement, as well a transmission 18 that transmits power from the power source 10 to the driven elements 14 at various gear ratios (also see FIG. 2). The transmission 18 may be an automatic transmission that allows automatic shifting between the gear ratios as is understood by those with ordinary skill in the art. Although depicted as a wheel loader 20, the machine 10 may be other types of machines having the aforementioned components such as, but not limited to, vehicles or work machines such as off-highway trucks, mining equipment, tractors, excavators, and dozers.

Figure 2:
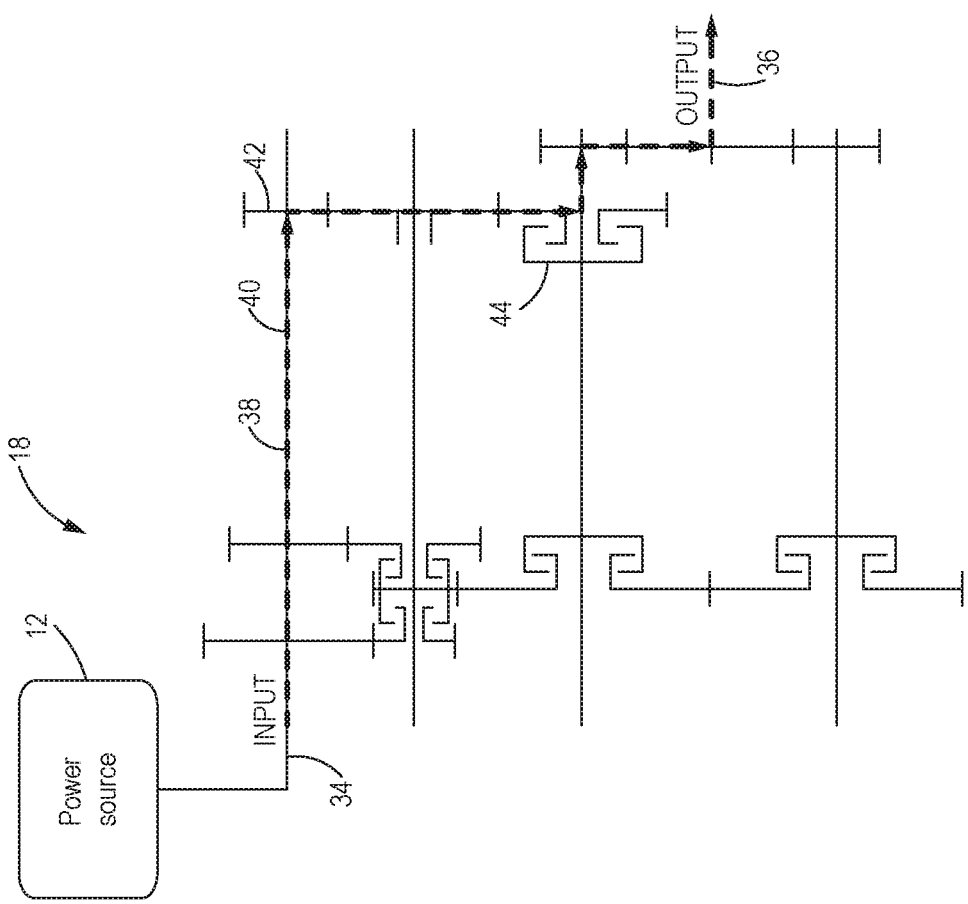
FIG. 2 is a schematic representation of an exemplary transmission of the machine having a torque path with a single clutch element, in accordance with the present disclosure.

FIG. 2 shows a transmission 18 in accordance with the present disclosure. As those with ordinary skill in the art will appreciate, the depicted transmission 18 is merely exemplary and may have various other configurations in practice. The transmission 18 may include an input shaft 34 rotationally coupled to the power source 12, an output shaft 36 rotationally coupled to the driven elements 14, and a torque path 38 providing a path for transmission of torque at a gear ratio from the input shaft 34 to the output shaft 36. As will be understood by those with ordinary skill in the art, power may be transmitted along the torque path 38 via interconnecting shafts 40 and gears 42 that rotationally couple to transmit power to the output shaft 36 at the specific gear ratio. A single, hydraulically-actuated clutch element 44 may be along the torque path 38 that allows the transmission of torque along the torque path 38 when engaged, and blocks the transmission of torque along the torque path 38 when disengaged. The clutch element 44 may be the only clutch element in the torque path 38, and may be any type of hydraulically-actuated clutch element such as, but not limited to, a multi-disc wet clutch or other types of hydraulically-actuated clutches. The transmission 18 may also include additional torque paths with one or more clutch elements for transmission at other gear ratios, but are not discussed here for clarity purposes. The use of a single clutch element 44, rather than two or more as in prior art systems, may provide advantages such as reduced manufacturing costs and reduced packaging space. In the transmission 18 of the present disclosure, a hydraulic control system 46 may be used to interrupt power transmission in the case of failure of the actuation valve for the clutch element 44 (see FIG. 3 and further details below).

Figure 3:
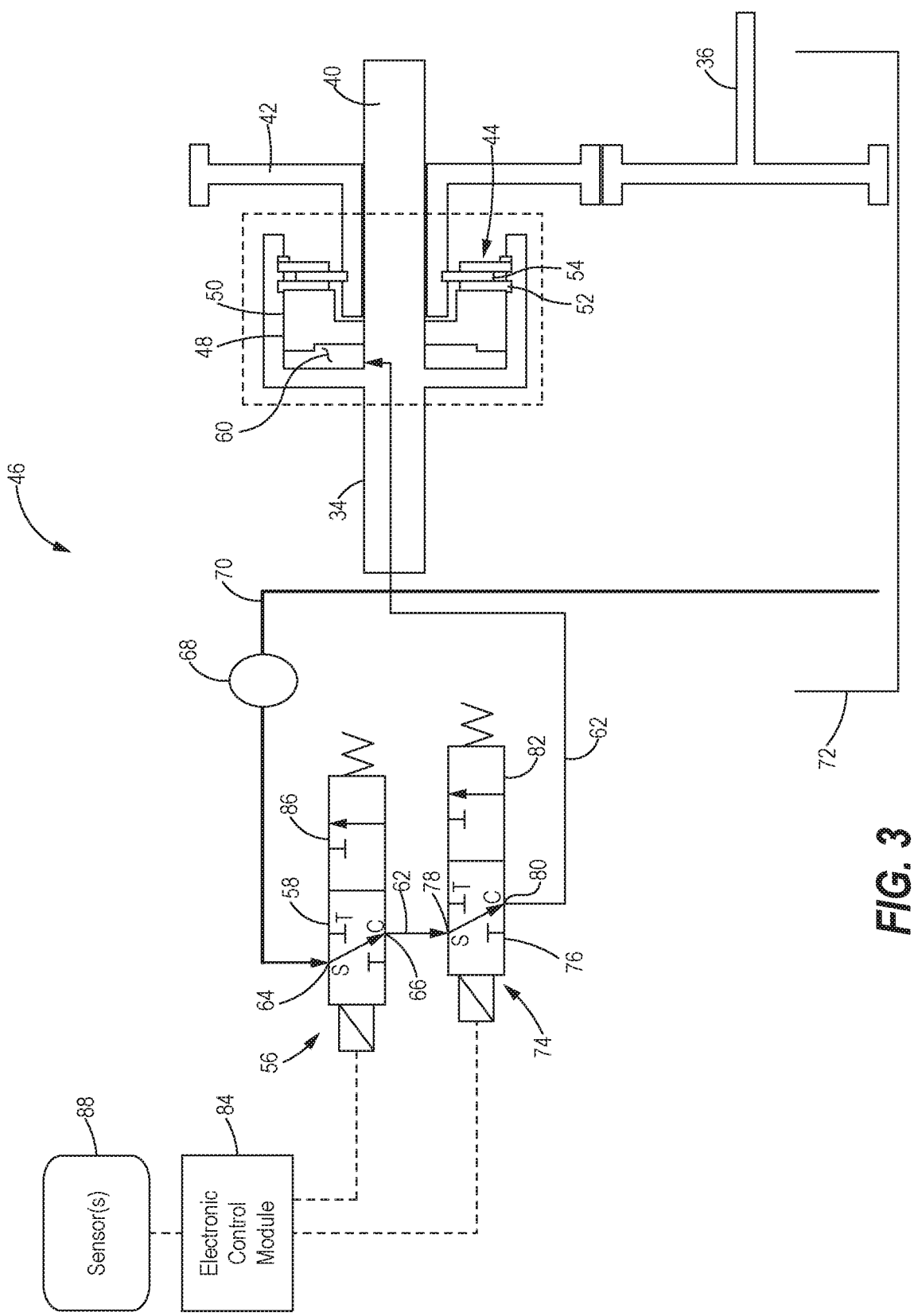
FIG. 3 is a schematic representation of a hydraulic control system for the single clutch element under normal conditions with a clutch pressure control (CPC) valve in an open position to engage the clutch element, constructed in accordance with the present disclosure.

Referring to FIG. 3, the hydraulic control system 46 for the single clutch element 44 under normal (non-failure) conditions during engagement of the clutch element 44 is shown. The hydraulic control system 46 may include a clutch actuator 48, such as a clutch piston 50, that uses hydraulic fluid pressure to actuate shifting of the clutch element 44 between engaged and disengaged. For example, if the clutch element 44 is a multi-disk wet clutch, the clutch actuator 48 may apply pressure to compress plates 52 and friction discs 54 of the clutch element 44 to shift the clutch element 44 to the engaged position and allow rotational coupling between an input shaft 34 and the output shaft 36. The control system 46 may further include a clutch pressure control (CPC) valve 56 as the actuation valve for the clutch element 44. In an open position 58, the CPC valve 56 may permit flow of the hydraulic fluid to a clutch cavity 60 through a control pressure line 62, thereby compressing the clutch actuator 48, and causing the clutch actuator 48 to engage the clutch element 44. Specifically, in the open position 58, a supply port 64 of the CPC valve 56 is connected to a control port 66, allowing the high pressure hydraulic fluid to flow into the control pressure line 62 to the clutch actuator 48. A pump 68 may supply the high pressure hydraulic fluid to the CPC valve 56 via one or more supply lines 70 from a hydraulic fluid sump 72.

The control system 46 may further include a failure mode response (FMR) valve 74 in the control pressure line 62 between the CPC valve 56 and the clutch actuator 48. As explained further below, the FMR valve 74 may respond to a failed condition of the CPC valve 56 by blocking power transmission along the torque path 38 to halt or prevent uncommanded motion in the machine 10. The FMR valve 74 may have a normal position 76 that allows the flow of the hydraulic fluid from the CPC valve 56 to the clutch actuator 48 when the CPC valve 56 is in the open position 58. Specifically, in the normal position 76 of the FMR valve 74, a supply port 78 is connected to a control port 80 to allow the high pressure hydraulic fluid to flow from the CPC valve 56 to the clutch actuator 48. As explained in further detail below, the FMR valve 74 may also include a failure position 82 that obstructs the flow of the high pressure hydraulic fluid from the CPC valve 56 to the clutch actuator 48 while simultaneously allowing flow from the clutch actuator 48 to the hydraulic fluid sump 72 when the CPC valve 56 is in the open position 58 and in the failed condition. The CPC valve 56 and the FMR valve 74 may be normally closed solenoid valves, as shown in FIG. 3. However, in other arrangements, the CPC valve 56 and the FMR valve 74 may be any combination of normally open or normally closed solenoid valves, pilot valves, or other suitable types of valves.

Additionally, the control system 46 may include an electronic control module (ECM) 84 in communication with the CPC valve 56 and the FMR valve 74 for control thereof. In response to gear commands for machine operation, the ECM 84 may command shifting of the CPC valve 56 between the open position 58 and a closed position 86 as needed to engage or disengage the clutch element 44. The ECM 84 may also command shifting of the FMR valve 74 between the normal position 76 and the failure position 82 according to the condition of the CPC valve 56. As explained further below, the ECM 84 may command shifting of the FMR valve 74 to the failure position 82 when a failed condition of the CPC valve 56 is detected. In order to determine whether the CPC valve 56 is in the failed condition, the ECM 84 may be in communication with and receive signals from one or more sensors 88 capable of detecting the failed condition of the CPC valve 56. Under normal conditions when engaging the clutch element 44, and when the CPC valve 56 and the FMR valve 74 are normally closed solenoid valves, the ECM 84 may energize both the CPC valve 56 and the FMR valve 74 to position the valves in the open position 58 and the normal position 76, respectively.

Figure 4:
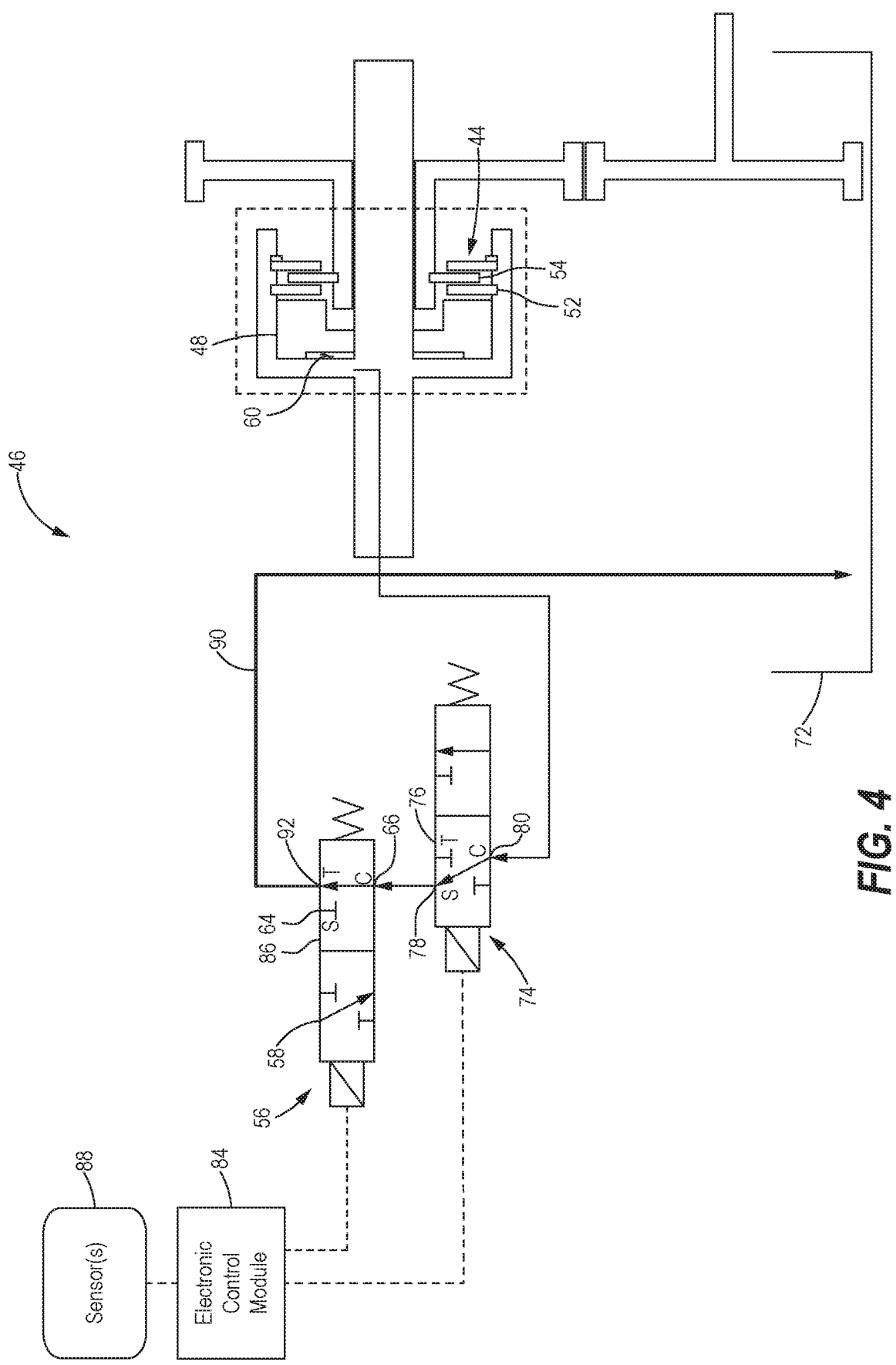
FIG. 4 is a schematic representation similar to FIG. 3 but with the CPC valve in a closed position to disengage the clutch element, constructed in accordance with the present disclosure.

Turning now to FIG. 4, the control system 46 under normal (non-failure) conditions when disengaging the clutch element 44 is shown. Under these conditions, the CPC valve 56 may be in the closed position 86, allowing the hydraulic fluid to drain from the clutch cavity 60 through one or more drain lines 90 into the hydraulic fluid sump 72 as the clutch actuator 48 releases pressure on the plates 52 and the friction discs 54. In the closed position 86, the supply port 64 of the CPC valve 56 may be closed, and the control port 66 may be connected to a tank port 92 for draining the hydraulic fluid to the sump 72. If the CPC valve 56 is a normally closed solenoid valve, the ECM 84 may de-energize the valve 56 to shift the valve 56 from the open position 58 to the closed position 86. Furthermore, the FMR valve 74 may remain in the normal position 76 allowing the hydraulic fluid to drain from the clutch cavity 60 to the CPC valve 56 via the connected control port 80 and supply port 78.

Figure 5:
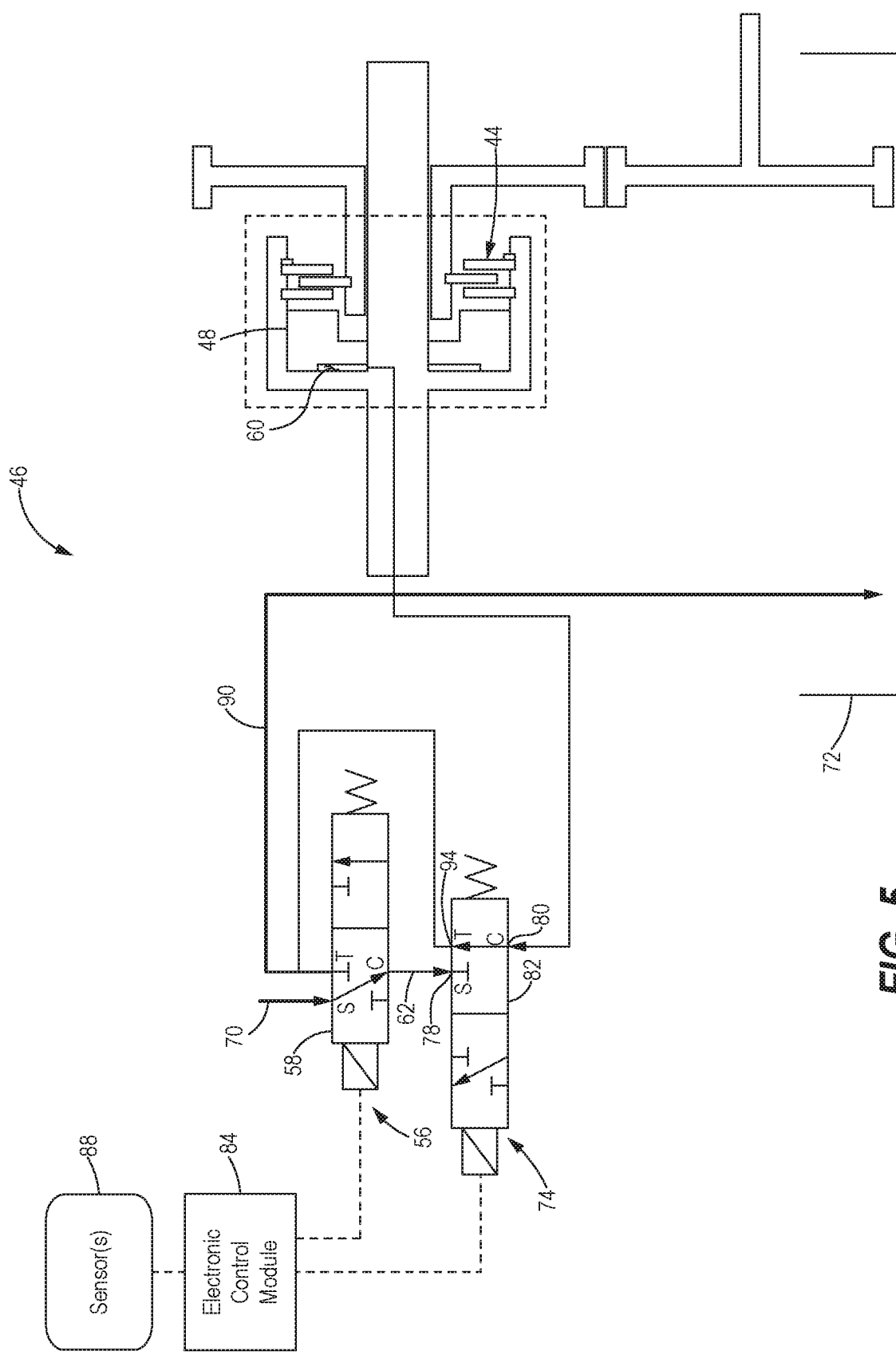
FIG. 5 is a schematic representation of the hydraulic control system under a failed condition of the CPC valve with a failure mode response (FMR) valve in a failure position to interrupt the transmission of torque along the torque path, constructed in accordance with the present disclosure.

FIG. 5 shows the control system 46 under a failed condition when the CPC valve 56 is in the open position 58 for engaging the clutch element 44 without a command from the ECM 84. That is, in the failed condition, the CPC valve 56 may be in the open position 58 to allow hydraulic fluid to flow to the clutch cavity 60 even though commanded to a zero pressure by the ECM 84. Under these conditions, the FMR valve 74 may shift to the failure position 82 to obstruct the flow of the hydraulic fluid from the CPC valve 56 to the clutch cavity 60 and the clutch actuator 48, and thereby prevent or cease uncommanded engagement of the clutch element 44. That is, when the FMR valve 74 is in the failure position 82, the transmission of torque along the torque path 38 may be interrupted to prevent uncommanded machine movement. While in the failure position 82, the FMR valve 74 may simultaneously permit the hydraulic fluid to drain from the clutch cavity 60 to the hydraulic fluid sump 72 through the drain line 90, thereby bypassing the CPC valve 56 and allowing the disengagement of the clutch element 44. Specifically, the supply port 78 of the FMR valve 74 may be closed, and the control port 80 may be connected to a tank port 94 in fluid communication with the drain line 90, allowing the hydraulic fluid to drain from the clutch cavity 60 into the hydraulic fluid sump 72. According to signals received from the sensor(s) 88, the ECM 84 may detect the failed condition of the CPC valve 56 and command the FMR valve 74 to shift to or remain in the failure position 82. If the FMR valve 74 is a normally closed solenoid valve, the ECM 84 may de-energize the FMR valve 74 to shift the FMR valve 74 to the failure position 82. In one configuration, the sensor(s) 88 may be one or more speed or torque sensors associated with one or more shafts 40 along the torque path 38 and/or the input and output shafts 34 and 36. With knowledge of the commanded gear and the sensed transmission speed or torque received from the sensor(s) 88, the ECM 84 may determine if the CPC valve 56 is in the failed condition.

Figure 6:
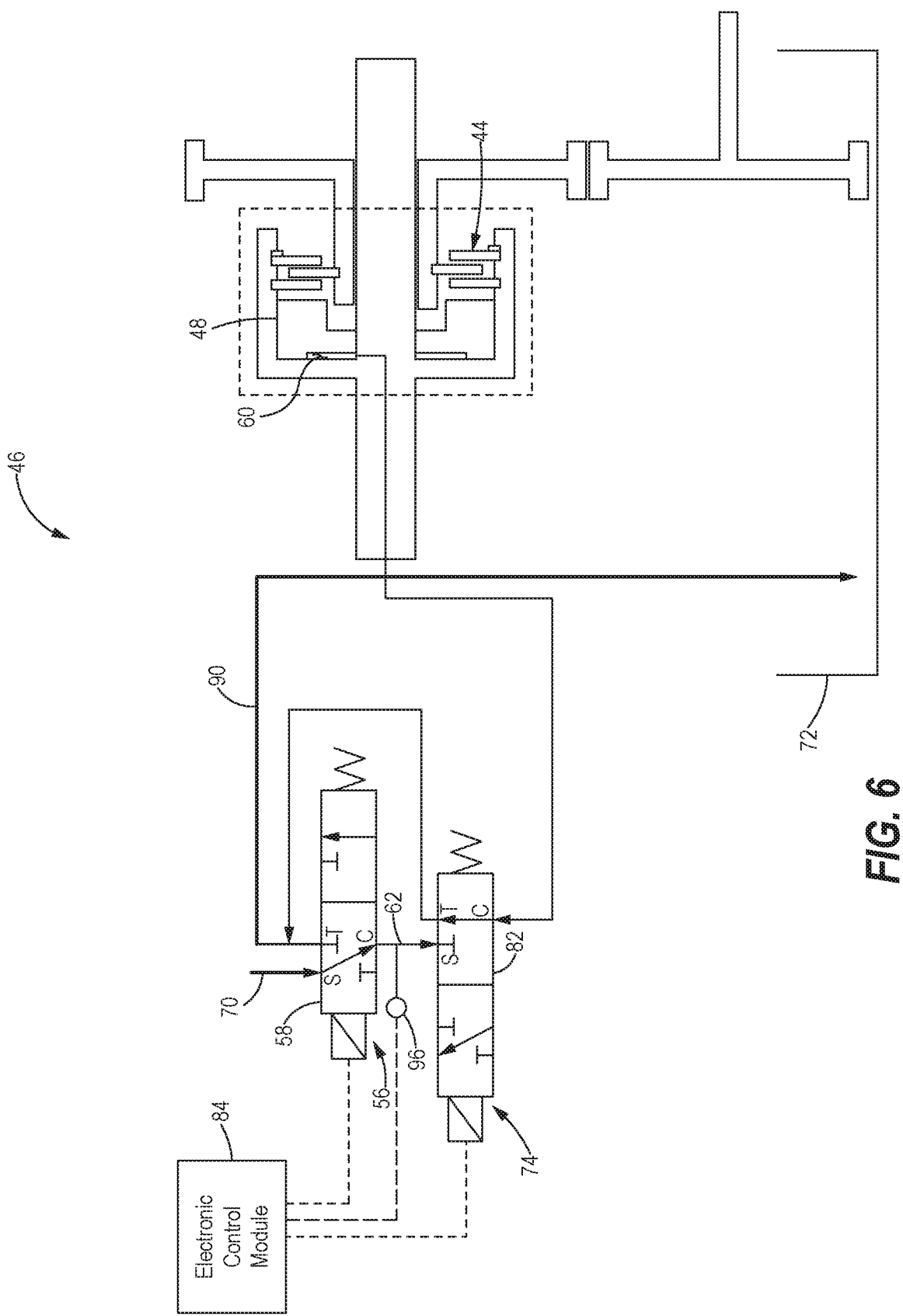
FIG. 6 is a schematic representation similar to FIG. 5 but with a pressure sensor in a control pressure line between the CPC valve and the FMR valve, constructed in accordance with the present disclosure.

Alternatively, as shown in FIG. 6, the control system 46 may include one or more pressure sensors 96 to allow detection of the failed condition of the CPC valve 56. The pressure sensor 96 may be associated with the control pressure line 62 between the CPC valve 56 and the FMR valve 74, and may detect hydraulic fluid pressure in the control pressure line 62. When the CPC valve 56 is in the failed condition (i.e., in the open position 58 without a command from the ECM 84), hydraulic fluid pressure may exist in the control pressure line due to uncommanded hydraulic fluid flow from the CPC valve 56. The ECM 84 may be in communication with the pressure sensor 96 and may receive signals from the pressure sensor 96 indicating that hydraulic fluid pressure exists in the control pressure line 62. If the CPC valve 56 is not commanded to be in the open position 58, the ECM 84 may determine that the CPC valve 56 is in the failed condition upon receipt of such signals from the pressure sensor 96. If the ECM 84 determines that the CPC valve 56 is in the failed condition, the ECM 84 may command the FMR valve 74 to shift to or remain in the failure position 82 to obstruct uncommanded hydraulic fluid flow to the clutch actuator 48 and prevent or cease uncommanded engagement of the clutch element 44. In the failure position 82, the hydraulic fluid from the clutch cavity 60 may drain through the FMR valve 74 to the hydraulic fluid sump 72 allowing the clutch element 44 to disengage. Compared to the speed or torque sensors described above which may have a delay in response time, the pressure sensor 96 may provide direct or real-time monitoring of a failed condition of the CPC valve 56. The ECM 84 may continually monitor the output signal from the pressure sensor 96, and trigger shifting of the FMR valve 74 to the failure position 82 at any point when hydraulic fluid pressure is detected in in the control pressure line 62 and the CPC valve 56 is commanded to zero pressure.

During start-up of the machine 10, the FMR valve 74 may be in the failure position 82 by default to prevent uncommanded engagement of the clutch element 44 in case the CPC valve 56 is already in the failed condition. A rise in pressure in the control pressure line 62 detected by the pressure sensor 96 may be immediately detected by the ECM 84 and, if the CPC valve 56 is commanded to zero pressure, the ECM 84 may maintain the FMR valve 74 in the failure position 82. Additionally, the pressure sensor 96 may allow a direct and immediate signal of a failed condition of the CPC valve 56 during normal operation of the machine 10, permitting the ECM 84 to immediately respond by triggering the shifting of the FMR valve 74 to the failure position 82. Thus, in either start-up or normal operating conditions, uncommanded engagement of the clutch element 44 and resulting uncommanded machine motion may be prevented when the CPC valve 56 fails.

INDUSTRIAL APPLICABILITY

In general, the teachings of the present disclosure may find applicability in many industries including, but not limited to, construction, agricultural, mining, industrial, commercial, transportation, or marine applications. More specifically, the teachings of the present disclosure may find applicability in any industry relying on transmissions with hydraulically-actuated clutch elements.

Figure 7:
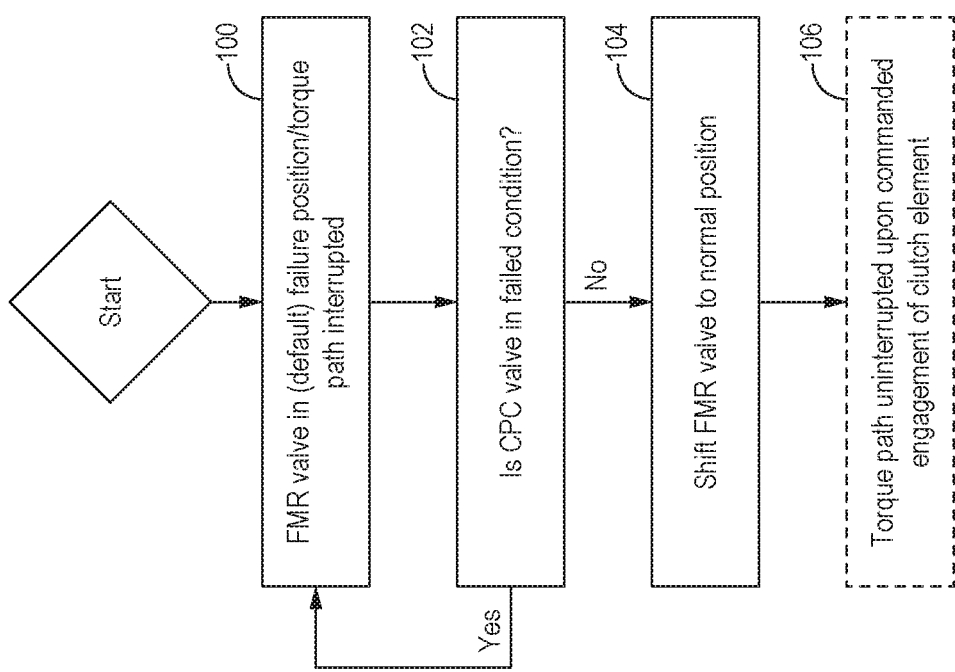
FIG. 7 is a flowchart of a series of steps that may be involved in controlling the clutch element when starting up the machine, in accordance with a method of the present disclosure.

FIG. 7 shows a series of steps that may be involved in controlling the single clutch element 44 of the torque path 38 using the hydraulic control system 46 when starting up the machine 10. Upon start-up of the machine 10, the ECM 84 may command the FMR valve 74 to be in the failure position 82 by default according to block 100. At a next block 102, the ECM 84 may determine if the CPC valve 56 is in the failed condition according to signals received from the sensor(s) 88. For example, the pressure sensor 96 may send signals to the ECM 84 indicating that hydraulic fluid pressure exists in the control pressure line 62, and the ECM 84 may then determine that the CPC valve 56 is in the failed condition if the CPC valve 56 is not commanded to be in the open position 58. If the ECM 84 determines that the CPC valve 56 is in the failed condition, the ECM 84 may command the FMR valve 74 to stay in the failure position 82 (block 100). If the ECM 84 determines that the CPC valve 56 is not in the failed condition, the ECM 84 may command the FMR valve 74 to shift to the normal position 76 to allow the CPC valve 56 to actuate engagement of the clutch element 44 when commanded to do so (block 104). With the FMR valve 74 in the normal position 76, the transmission of torque along the torque path 38 is uninterrupted upon commanded engagement of the clutch element 44 (block 106).

Figure 8:
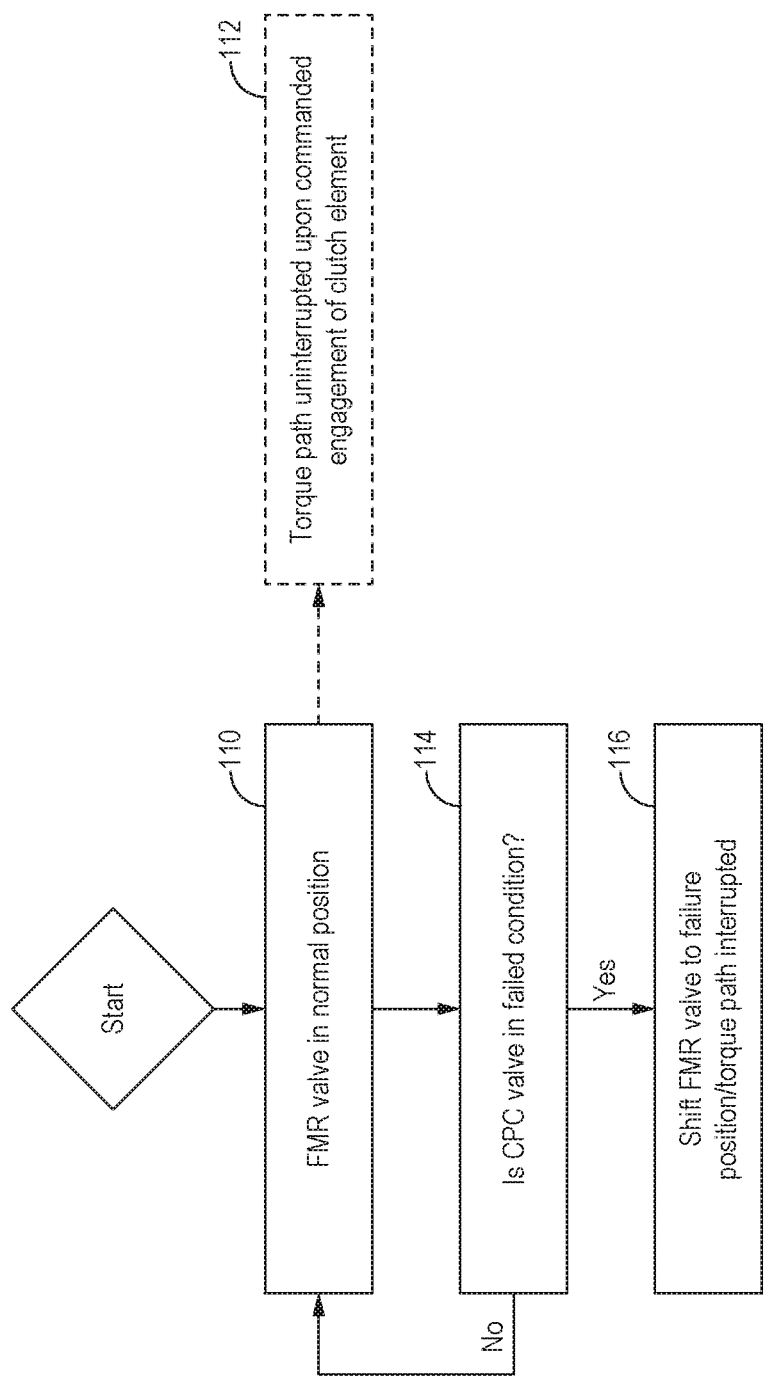
FIG. 8 is a flowchart of a series of steps that may be involved in controlling the clutch element during the operation of the machine, in accordance with a method of the present disclosure.

Turning to FIG. 8, a series of steps that may be involved in controlling the clutch element 44 using the hydraulic control system 46 during operation of the machine 10 is shown. The FMR valve 74 may begin in the normal position 76, allowing the CPC valve 56 to actuate engagement of the clutch element 44 according to commands from the ECM 84 (block 110). With the FMR valve 74 in the normal position 76, the transmission of torque along the torque path 38 may be uninterrupted upon commanded engagement of the clutch element 44 (block 112). At a next block 114, the ECM 84 may determine if the CPC valve 56 is in the failed condition according to signals received from the sensor(s) 88. If it is determined that the CPC valve 56 is not in the failed condition, the FMR valve 74 may remain in the normal position 76 (block 110). If it is determined that the CPC valve 56 is in the failed condition, the ECM 84 may command the FMR valve 74 to shift to the failure position 82, thereby halting or preventing uncommanded engagement of the clutch element 44 and uncommanded motion of the machine 10 (block 116).

The hydraulic control system disclosed herein includes a failure mode response (FMR) valve to block transmission of torque along a torque path when an actuation valve (clutch pressure control (CPC) valve) of a clutch element in the torque path is failed to an open position without a command With the FMR valve in the failure position, uncommanded engagement of the clutch element and resulting undesired machine motion is prevented. In the failure position, the FMR valve obstructs the flow of hydraulic fluid from the CPC valve to the clutch actuator, while simultaneously permitting the flow hydraulic fluid from the clutch actuator to a hydraulic fluid sump to allow disengagement of the clutch element. The FMR valve allows the use of a single clutch element in the torque path, without the need for a second clutch element to interrupt the torque path in the case of failure of the CPC valve of the other clutch element. As such, packaging space and manufacturing costs for the transmission may be reduced. In addition, the use of a pressure sensor in the control pressure line between the CPC valve and the FMR valve allows the failed condition of the CPC valve to be tracked directly and in real-time, avoiding response delays that may be associated with other sensing systems of the prior art.

What is claimed is:

1. A transmission for a machine, comprising:
an input shaft rotationally coupled to a power source;
an output shaft;
a torque path providing a path for transmission of torque at a gear ratio from the input shaft to the output shaft;
a single clutch element along the torque path, the clutch element being configured to permit the transmission of torque from the input shaft to the output shaft when engaged, the clutch element being further configured to block the transmission of torque from the input shaft to the output shaft when disengaged;
a clutch actuator configured to actuate shifting of the clutch element between engaged and disengaged;
a clutch pressure control (CPC) valve having an open position and a closed position, the CPC valve being configured to permit a flow of hydraulic fluid to the clutch actuator through a control pressure line when in the open position to cause the clutch actuator to engage the clutch element; and
a failure mode response (FMR) valve in the control pressure line between the CPC valve and the clutch actuator, the FMR valve having a normal position permitting the flow of the hydraulic fluid from the CPC valve to the clutch actuator when the CPC valve is in the open position, and a failure position obstructing the flow of the hydraulic fluid from the CPC valve to the clutch actuator when the CPC valve is in the open position, the transmission of torque along the torque path being interrupted when the FMR valve is in the failure position.

2. The transmission of claim 1, further comprising an electronic control module (ECM) in electronic communication with the CPC valve and FMR valve, the ECM being configured to:
command shifting of the CPC valve between the open position to engage the clutch element, and the closed position to disengage the clutch element; and
command shifting of the FMR valve between the normal position and the failure position, the ECM commanding the shifting of the FMR valve to the failure position upon detecting a failed condition of the CPC valve, the CPC valve being in the failed condition when the CPC valve is in the open position without a command from the ECM.

3. The transmission of claim 2, further comprising one or more sensors in communication with the ECM, the ECM being configured to determine whether the CPC valve is in the failed condition based on signals received from the sensors.

4. The transmission of claim 2, further comprising a pressure sensor associated with the control pressure line and configured to detect hydraulic fluid pressure in the control pressure line, the pressure sensor being in communication with the ECM.

5. The transmission of claim 4, wherein the ECM is further configured to receive signals from the pressure sensor indicating that hydraulic fluid pressure exists in the control pressure line, and to determine whether the CPC valve is in the failed condition based on the received signals.

6. The transmission of claim 5, wherein the ECM is further configured to determine that the CPC valve is in the failed condition when the CPC valve is not commanded to be in the open position and when the ECM receives the signals from the pressure sensor indicating that hydraulic fluid pressure exists in the control pressure line.

7. The transmission of claim 2, further comprising a hydraulic fluid sump and a pump configured to supply the hydraulic fluid to the CPC valve through a supply line for delivery to the clutch actuator through the control pressure line when the CPC valve is in the open position.

8. The transmission of claim 7, wherein the FMR valve is configured to permit a drain of the hydraulic fluid from the clutch actuator to the hydraulic fluid sump through a drain line when in the failure position to allow disengagement of the clutch element.

9. The transmission of claim 8, wherein the FMR valve is in the failure position by default upon start-up of the machine.

10. The transmission of claim 8, wherein the clutch element is the only clutch element in the torque path.

11. A hydraulic control system for controlling a clutch element of a transmission of a machine, the transmission having a torque path for transmission of torque at a gear ratio from an input shaft to an output shaft, the clutch element being the only clutch element along the torque path and being configured to permit the transmission of torque from the input shaft to the output shaft when engaged, comprising:
a clutch actuator configured to actuate shifting of the clutch element between engaged and disengaged;
a clutch pressure control (CPC) valve having an open position and a closed position, the CPC valve being configured to permit a flow of hydraulic fluid to the clutch actuator through a control pressure line when in the open position to cause the clutch actuator to engage the clutch element, the CPC valve being further configured to permit a drain of the hydraulic fluid from the clutch actuator to a hydraulic fluid sump when in the closed position;
a failure mode response (FMR) valve in the control pressure line between the CPC valve and the clutch actuator, the FMR valve having a normal position permitting the flow of the hydraulic fluid from the CPC valve to the clutch actuator when the CPC valve is in the open position, and a failure position obstructing the flow of the hydraulic fluid from the CPC valve to the clutch actuator when the CPC valve is in the open position;
at least one sensor configured to detect a failed condition of the CPC valve; and
an electronic control module (ECM) in electronic communication with the CPC valve, the FMR valve, and the sensor, the ECM being configured to command shifting of the CPC valve between the open position and the closed position and to command shifting of the FMR valve between the normal position and the failure position, the ECM commanding the shifting of the FMR valve to the failure position upon receipt of one or more signals from the sensor indicating the failed condition of the CPC valve.

12. The hydraulic control system of claim 11, wherein the CPC valve is in the failed condition when the CPC valve is in the open position without a command from the ECM.

13. The hydraulic control system of claim 12, wherein the sensor is configured to detect the failed condition of the CPC valve by detecting uncommanded engagement of the clutch element.

14. The hydraulic control system of claim 12, wherein the FMR valve is configured to permit a drain of the hydraulic fluid from the clutch actuator to the hydraulic fluid sump through a drain line when in the failure position to allow disengagement of the clutch element.

15. The hydraulic control system of claim 12, wherein the clutch element is a multi-disk wet clutch, and wherein the clutch actuator is a clutch piston that compresses the multi-disk wet clutch in response to pressure from the flow of the hydraulic fluid from the CPC valve.

16. The hydraulic control system of claim 12, wherein the sensor is a pressure sensor in the control pressure line between the CPC valve and the FMR valve, and wherein the pressure sensor is configured to detect hydraulic fluid pressure in the control pressure line.

17. The hydraulic control system of claim 16, wherein the ECM is further configured to determine that the CPC valve is in the failed condition when the CPC valve is not commanded to be in the open position and when the ECM receives the signals from the pressure sensor indicating that hydraulic fluid pressure exists in the control pressure line.

18. A method for hydraulically controlling a clutch element along a torque path of a transmission of a machine, the transmission including a clutch actuator configured to actuate shifting of the clutch element between engaged and disengaged, a clutch pressure control (CPC) valve having an open position configured to permit a flow of hydraulic fluid to the clutch actuator through a control pressure line to cause the clutch actuator to engage the clutch element, and a failure mode response (FMR) valve in the control pressure line between the CPC valve and the clutch actuator, the method comprising:

determining whether the CPC valve is in a failed condition, the CPC valve being in the failed condition when the CPC valve is in the open position without a command to be in the open position;

commanding the FMR valve to shift to or stay in a failure position if the CPC valve is in the failed condition, the failure position of the FMR valve obstructing the flow of the hydraulic fluid from the CPC valve to the clutch actuator while simultaneously allowing the flow of the hydraulic fluid from the clutch actuator to a hydraulic fluid sump when the CPC valve is in the open position, the transmission of torque along the torque path being interrupted when the FMR valve is in the failure position; and commanding the FMR valve to shift to or stay in a normal position if the CPC valve is not in the failed condition, the normal position of the FMR valve permitting the flow of the hydraulic fluid from the CPC valve to the clutch actuator when the CPC valve is in the open position.

19. The method of claim 18, wherein the method is performed by an electronic control module (ECM) of the machine.

20. The method of claim 19, wherein determining whether the CPC valve is in the failed condition comprises receiving signals from a pressure sensor associated with the control pressure line indicating whether hydraulic fluid pressure exists in the control pressure line, the ECM determining that the CPC valve is in the failed condition when the CPC valve is not commanded to be in the open position and when the ECM receives the signals from the pressure sensor indicating that hydraulic fluid pressure exists in the control pressure line.

* * * * *